(12) United States Patent
Hamilton et al.

(10) Patent No.: US 7,631,220 B1
(45) Date of Patent: *Dec. 8, 2009

(54) METHOD AND SYSTEM FOR COMPLETING A BACKUP JOB THAT WAS INTERRUPTED DURING A BACKUP PROCESS

(75) Inventors: Gregg R. Hamilton, Lake Mary, FL (US); Ashutosh K. Bahadure, Pune (IN); Sachin N. Bobade, Pune (IN)

(73) Assignee: Symantec Corporation, Mountain View, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/478,158

(22) Filed: Jun. 29, 2006

Related U.S. Application Data

(63) Continuation of application No. 10/657,675, filed on Sep. 8, 2003, now Pat. No. 7,085,962.

(51) Int. Cl.
*G06F 11/00* (2006.01)
*G06F 12/00* (2006.01)

(52) U.S. Cl. .................. 714/15; 714/13; 714/18; 711/162

(58) Field of Classification Search ............... 714/15, 714/6, 13, 18; 711/162; 707/202, 204
See application file for complete search history.

(56) References Cited

U.S. PATENT DOCUMENTS

| | | | |
|---|---|---|---|
| 5,241,668 A | 8/1993 | Eastridge et al. | |
| 5,758,359 A * | 5/1998 | Saxon | 707/204 |
| 5,778,165 A | 7/1998 | Saxon | |
| RE37,038 E | 1/2001 | Eastridge et al. | |
| 6,243,824 B1 | 6/2001 | Kakuta et al. | |
| 6,396,805 B2 * | 5/2002 | Romrell | 370/216 |
| 6,629,110 B2 | 9/2003 | Cane et al. | |
| 6,647,399 B2 * | 11/2003 | Zaremba | 707/204 |
| 6,910,098 B2 | 6/2005 | LeCrone et al. | |
| 6,941,490 B2 | 9/2005 | Ohran | |
| 6,959,368 B1 * | 10/2005 | St. Pierre et al. | 711/162 |
| 7,266,781 B1 * | 9/2007 | Burlowski | 715/834 |
| 2002/0163760 A1 | 11/2002 | Lindsey et al. | |
| 2002/0166035 A1 * | 11/2002 | Belknap et al. | 711/161 |
| 2003/0018878 A1 * | 1/2003 | Dorward et al. | 711/216 |
| 2003/0145168 A1 | 7/2003 | LeCrone et al. | |
| 2004/0254962 A1 * | 12/2004 | Kodama et al. | 707/201 |
| 2004/0260726 A1 * | 12/2004 | Hrle et al. | 707/104.1 |

OTHER PUBLICATIONS

Massiglia, Paul, "Veritas in E-Business", *Veritas Software Corporation* (2001), 83-89.

* cited by examiner

*Primary Examiner*—Hong Kim
(74) *Attorney, Agent, or Firm*—Moser IP Law Group

(57) ABSTRACT

A computer network, system and computer-readable medium for completing a backup job that was interrupted during a backup process is described. The computer-readable medium causes a processor to perform the steps of retrieving an object from one or more volumes stored in a client computer, determining whether the object is listed in a catalog, where the catalog comprises a partially backed up volume from a list of one or more volumes that still need to be backed up, determining whether the object is partially backed up if the object is listed in the catalog and writing the data contained in the object to one or more storage devices if the object is partially backed up or is not listed in the catalog.

21 Claims, 6 Drawing Sheets

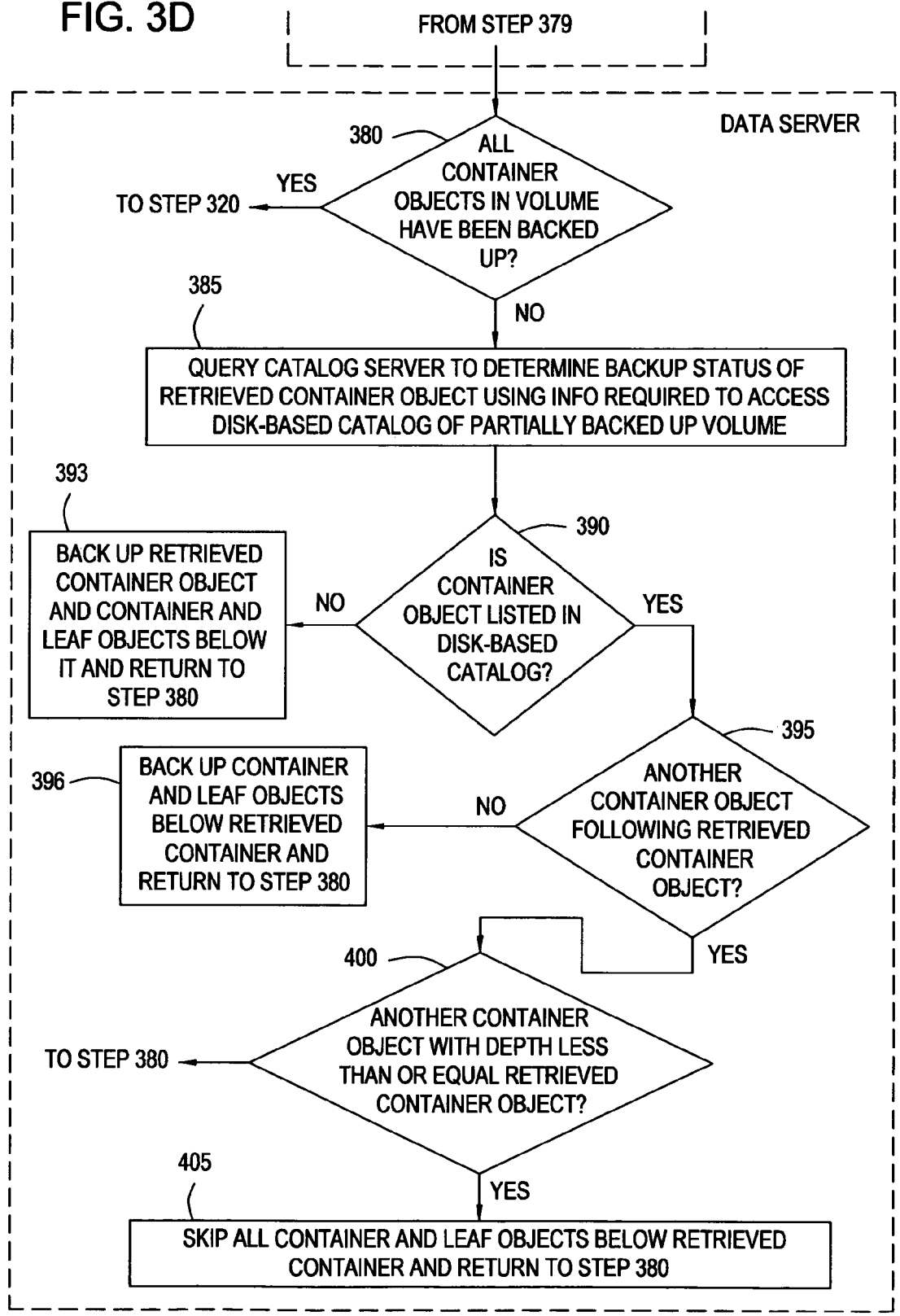

US 7,631,220 B1

METHOD AND SYSTEM FOR COMPLETING A BACKUP JOB THAT WAS INTERRUPTED DURING A BACKUP PROCESS

CROSS-REFERENCE TO RELATED APPLICATIONS

This application is a continuation of U.S. patent application Ser. No. 10/657,675, filed Sep. 8, 2003, now U.S. Pat. No. 7,085,962, issued Aug. 1, 2006. The aforementioned related patent application is herein incorporated by reference.

BACKGROUND OF THE INVENTION

1. Field of the Invention

Embodiments of the present invention generally relate to computer systems, and more particularly, to software for backing up data for computer systems.

2. Description of the Related Art

Backing up data for computer systems generally involves making a copy of that data, e.g., creating copies of that data in a database, another computer, disk, tape, and the like. The circumstances under which data is backed up are generally referred to as a session, a job or an event.

The backup services are generally performed by a backup system, such as computer, a server cluster or a plurality of clusters. The backup system may fail due to a number of operational faults, such as disk failures, and environmental faults, such as power outages caused by natural disasters. When the backup system fails during a backup process, the backup job is interrupted, thereby rendering the backup job incomplete. Typically, once the backup system is reactivated after the failure, the interrupted backup job would have to be processed again from the beginning, which increases the completion time for the entire backup process and the amount of resources needed to complete the job.

Therefore, a need exists in the art for a method and system for completing a backup job that was interrupted during the backup process from the point of failure rather than from the beginning of the backup job.

SUMMARY OF THE INVENTION

Embodiments of the present invention are generally directed to a method for completing a backup job that was interrupted during a backup process. After the backup server service identifies the interrupted job, the job manager builds a list of volumes associated with the interrupted job and removes from that list a set of volumes that correspond to the persistent record of completed volumes.

The job manager along with the catalog manager then identifies a volume that had been partially backed up during the interruption. In one embodiment, the partially backed up volume may be identified using the persistent records of the temporary catalog files and the amount data (bytes) that have been written to the storage devices. Once the partially backed up volume has been identified, the catalog server generates a disk-based catalog containing the partially backed up volume.

Prior to connecting to the data server to begin the process of writing data stored in the client computer to the storage devices, the job manager initializes the media server and the catalog server. Once the media server and the catalog server are initialized, the data server makes a determination as to whether each container object (directory) in the client computer is listed in the disk-based catalog. If the container object is not listed in the disk-based, catalog, then the data associated with the container object are written to the storage devices. If the container object is listed, then the data server further determines whether the container object was partially backed up or completely backed up. If the data server determines that the container object is partially backed up, then the data associated with the container object are written to the storage devices. If the data server determines that the container object is completely backed up, then the data associated with the container object are skipped from being written to the storage devices.

BRIEF DESCRIPTION OF THE DRAWINGS

The following detailed description makes reference to the accompanying drawings, which are now briefly described.

FIGS. 3A, 3B, 3C, and 3D illustrate a flowchart of a method for processing a backup job that was interrupted during a back up process in accordance with one embodiment of the invention.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
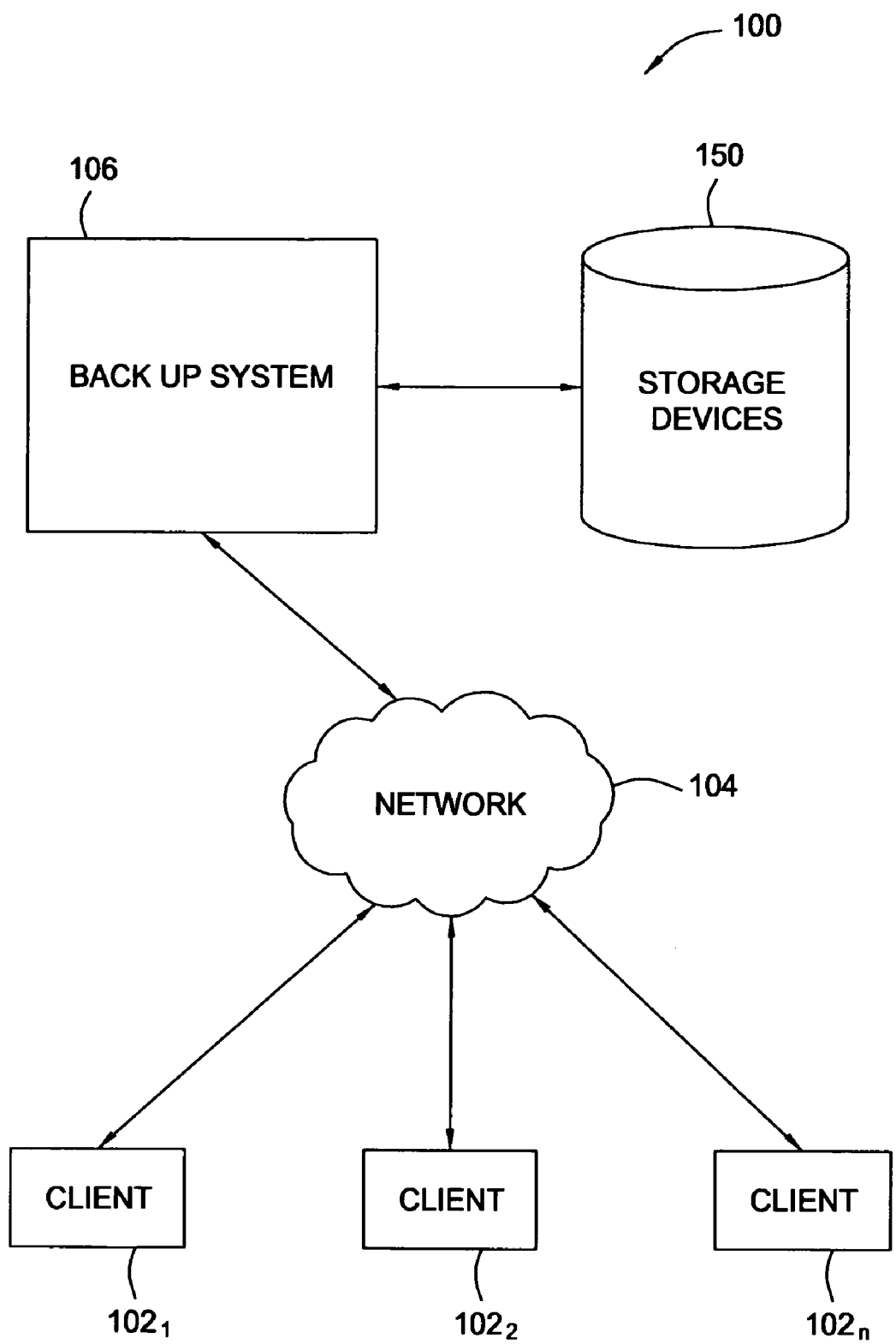
FIG. 1 illustrates a block diagram of a computer network that operates in accordance with one embodiment of the present invention.

FIG. 1 illustrates a block diagram of a computer network 100 in which embodiments of the invention may be utilized. The computer network 100 comprises a plurality of client computers $102_1$, $102_2$, ... $102_n$ that are connected to a backup system 106 via a communications network 104. The backup system 106 may be a single computer, a server cluster or a plurality of server clusters. The backup system 106 is generally configured to provide backup services to the client computers 102. Backup services generally include providing backup for data stored on the client computers 102 and restoration of the data if the original data are lost or corrupted.

The client computers $102_1$, $102_2$, ... $102_n$ may contain one or more individual computers, workstations, wireless devices, personal digital assistants, desktop computers, laptop computers or any other digital device that may benefit from connection to the computer network 100. Each client computer 102 generally comprises a central processing unit (CPU) 108, support circuits 110, and memory 112. The support circuits 110 are well known circuits used to promote functionality of the CPU 108. Such circuits may include cache, power supplies, clock circuits, input/output interface circuits, and the like. The memory 112 may comprise one or more of random access memory, read only memory, flash memory, removable disk storage, and the like. The memory 112 may store various software packages, such as an operating system (OS) software 114.

The communication network 104 may be one of many types of networks such as a local area network, wide area network, wireless network, or combinations thereof.

The backup system 106 is further connected to one or more storage devices 150, which are configured to store data from the client computers 102. Such data may include objects, such as files (leaf objects) and directories (container objects) of drives on the client computers 102. The storage devices 150 may be tape drives, DASD, and the like. Although the storage devices 150 are depicted as being outside of the backup system 106, the storage devices 150 may also be stored inside the backup system 106.

Figure 2:
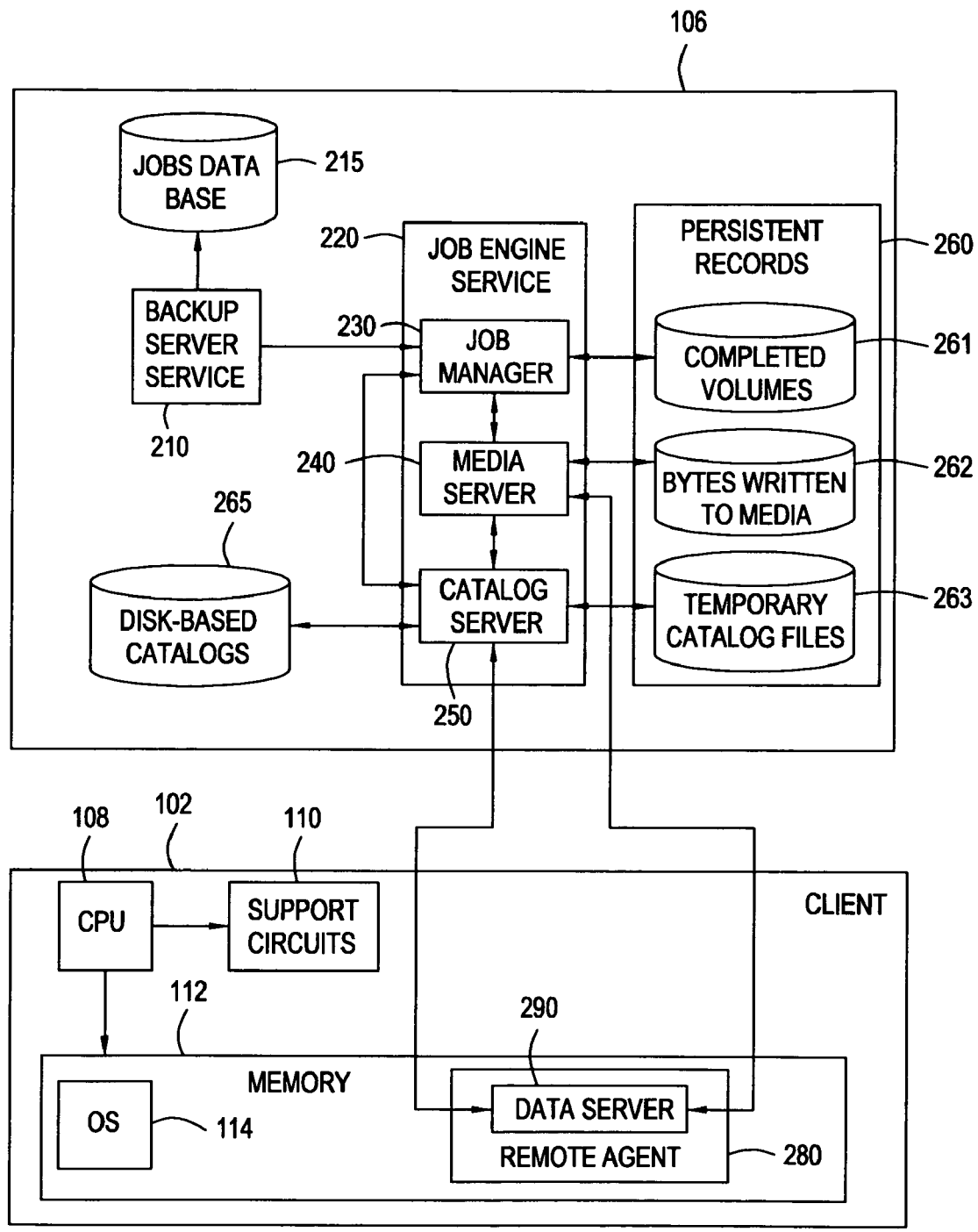
FIG. 2 illustrates a relational view between the backup system and one of the client computers in accordance with one embodiment of the invention.
Figure 3A:
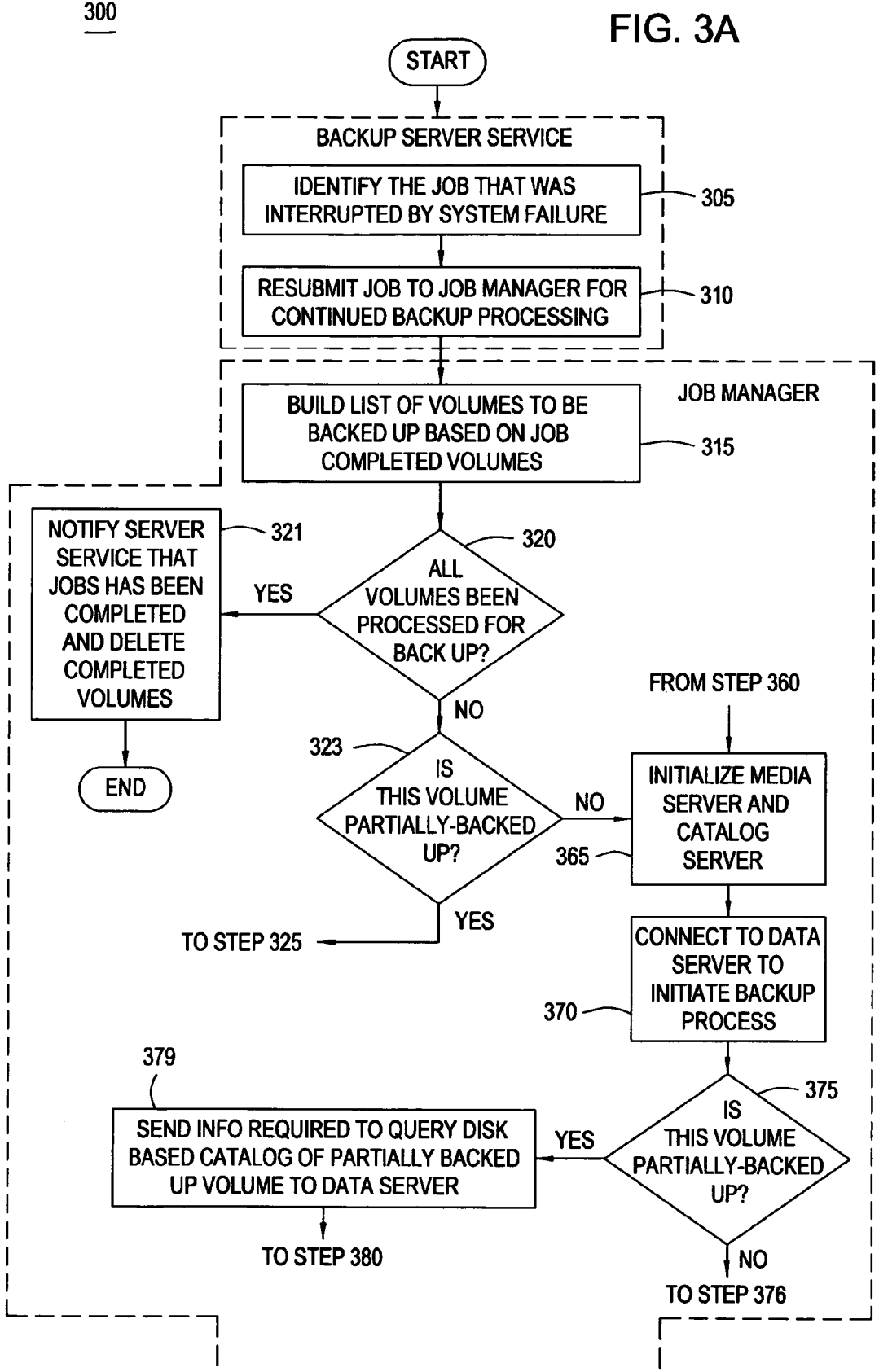
Figure 3B:
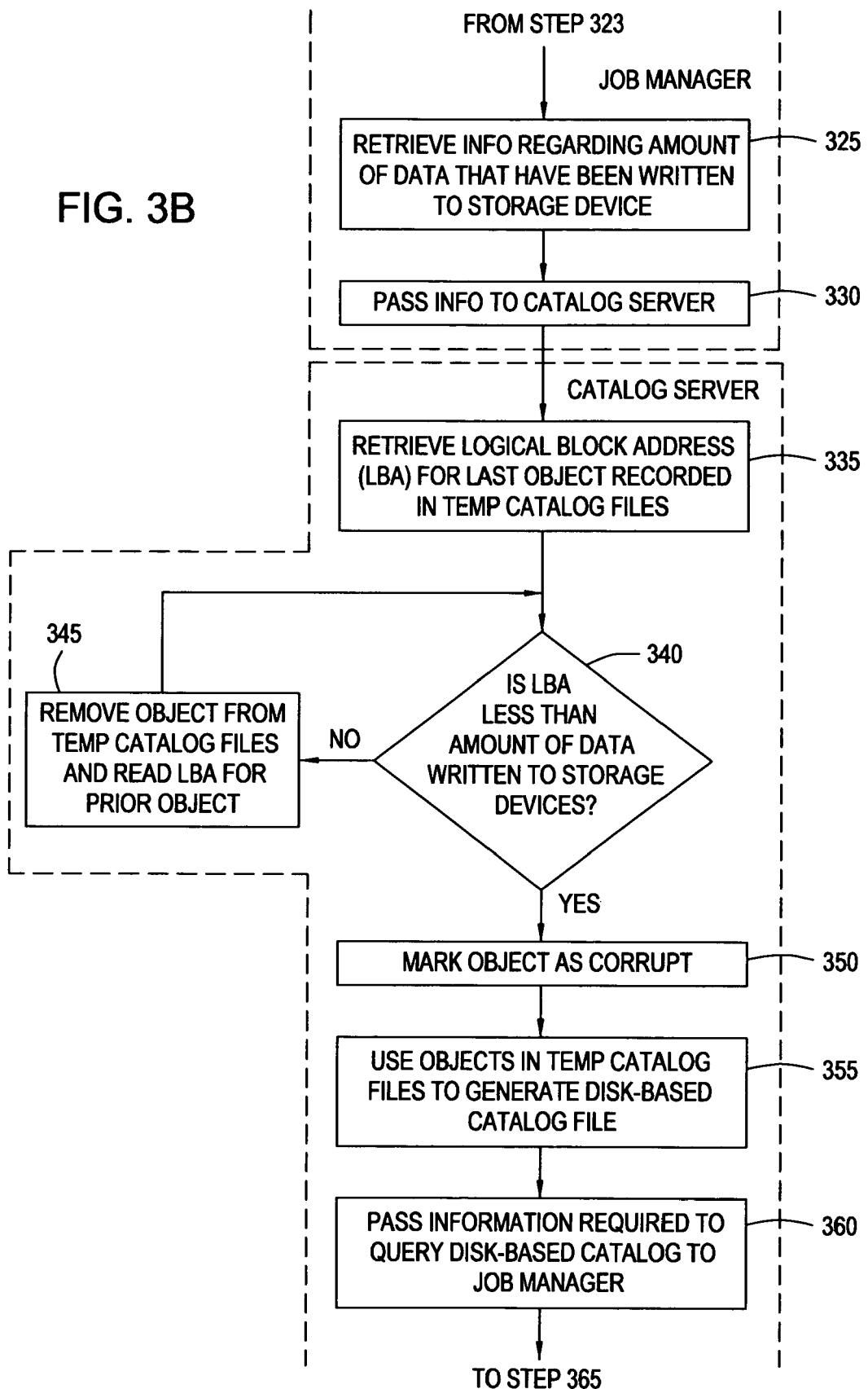
Figure 3C:
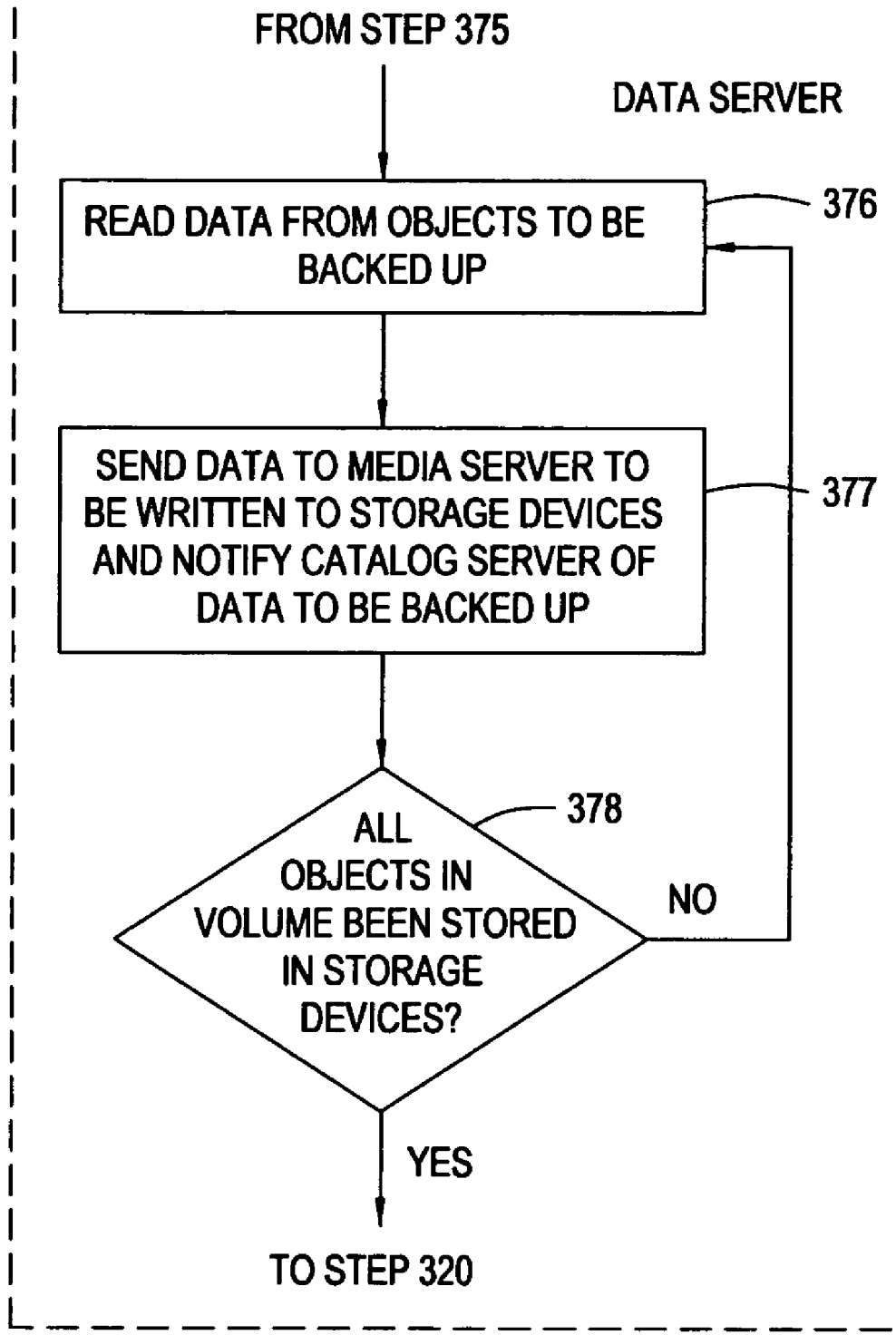

FIG. 2 illustrates a relational view between the backup system 106 and one of the client computers 102 in accordance with one embodiment of the invention. The backup system 106 includes a backup server service 210 generally configured to receive user requests to create new jobs (e.g., backup, restore, etc), to store jobs in a job database 215 and to submit jobs to the job manager 230 for execution at their scheduled times. The backup server service 210 may also be configured to maintain statistics on both active and completed jobs, to provide the user with a means for accessing these statistics, and to provide the user with a means for configuring the backup system 106 and the storage devices 150. Each backup job generally includes information regarding the volumes to be backed up and the scheduled run time, all of which are typically stored in the job database 215. As such, the job database 215 contains a list of jobs that need to be run with their scheduled run times, as well as historical information about the jobs, such as, job run times, statistical information and the like.

The backup system 106 also includes a job engine service 220, which is responsible for performing backup and restore operations with a remote agent 280 residing in the client computer 102. The job engine service 220 includes a job manager 230, a media server 240 and a catalog server 250. The job manager 230 is generally configured to receive job requests from the backup server service 210 and to interact with the catalog server 250, the media server 240 and the data server 290 in connection with execution of backup jobs. In addition, during a backup job, the job manager 230 is configured to maintain information regarding volumes that have been completely backed up. This information may be stored as a persistent record of completed volumes 261 in the persistent records memory 260.

During backup, the media server 240 is generally configured to receive data from the data server 290 and write the data to the storage devices 150. In addition, the media server 240 is configured to maintain information 262 regarding the amount of data (bytes) that have been written to the storage devices 150 and store such information 262 as a persistent record in the persistent records memory 260.

During backup, the catalog server 250 is generally configured to query and record information about the contents of storage media. More specifically, the catalog server 250 is configured to receive summary information on container and leaf objects of a given volume that is being backed up, and store that information in disk-based catalogs 265 upon successful backup of that volume. Disk-based catalogs 265 may include catalogs in nonvolatile RAM, e.g., MRAM or FeRAM. During the process of backing up a given volume, the catalog server 250 may also be configured to store information regarding the objects being backed up to one or more temporary catalog files 263. Such information may also be stored as a persistent record in the persistent records memory 260.

As mentioned above, the completed volumes 261, the information 262 regarding the amount of data that have been written to the storage devices 150, and the temporary catalog files 263 may be stored as persistent records. As such, they may be stored in one or more hard drives residing in the backup system 106.

The remote agent 280 is generally a service that runs on the client computer 102 and allows remote backup and restore of the client computer 102. The remote agent 280 includes a data server 290. During backup, the data server 290 is generally configured to read the data and attributes of container and leaf objects of a selected volume on the client computer 102, and send the data to the media server 240.

FIGS. 3A, 3B, 3C, and 3D illustrate a flowchart of a method 300 for processing a backup job that was interrupted during a back up process in accordance with one embodiment of the invention. After the backup server service 210 is restarted following a system failure, the backup server service 210 identifies the particular job that was interrupted by the system failure (step 305). The backup server service 210 then resubmits the interrupted job to the job manager 230 for continued backup processing (step 310). In one embodiment, the job may be resubmitted with a flag indicating to the job manager 230 that this job is a "restart" job, not a new job.

At step 315, the job manager 230 builds a list of volumes associated with the interrupted job and removes from that list a set of volumes that has been completely backed up prior to the system failure to generate a list of volumes that still need to be backed up. The set of volumes that has been completely backed up may be obtained from the persistent record of completed volumes 261.

At step 320, a determination is made as to whether all the volumes that need to be backed up have been processed. If the answer is in the negative, then the job manager 230 will retrieve a volume from a list of volumes to be backed up and determine whether the retrieved volume is partially backed up (step 323). Generally, only the first volume on the list is partially backed up. If the answer to the query at step 323 is in the negative, then processing continues to step 365, where the job manager 230 initializes the media server 240 to start maintaining a file containing the amount of data that have been written to the storage devices 150. The job manager 230 also initializes the catalog server 250 to start maintaining the temporary catalog files. Subsequent processing following step 365 will be described in detail in later paragraphs.

Referring back to step 323, if the answer is in the affirmative, then the job manager 230 will use the information 262 regarding the amount of data that have been written to the storage devices 150 and the temporary catalog files 263 to determine whether the retrieved volume from the list of volumes to be backed up was partially backed up prior to the system failure. In one embodiment, the job manager 230 retrieves information regarding the amount of data that have been written to the storage devices 150 (step 325). At step 330, the job manager 230 passes that information to the catalog server 250. At step 335, the catalog server 250 reads the logical block address (LBA) for the last recorded object from the temporary catalog files. LBA is generally defined as the offset of an object from the start of a backup set on the storage devices 150. During backup, in addition to storing objects to temporary catalog files, the catalog server 250 stores LBA for all of the objects in the temporary catalog files 263.

At step 340, a determination is made as to whether the LBA for the last recorded object is less than the amount of data (bytes) that have been written to the storage devices 150. An answer in the negative indicates that the object has not been written to the storage devices 150. At step 345, the catalog server 250 removes the last recorded object from the temporary catalog files and reads the LBA for the object previous to the last recorded object. Processing then returns to step 340. An answer in the affirmative indicates that all of the objects prior to the recorded object have been written to the storage devices 150. However, the last recorded object may only be partially written and will be backed up again in its entirety in a subsequent backup process. At step 350, the catalog server 250 marks this object as corrupt.

At step 355, the catalog server 250 uses the objects that are currently listed in the temporary catalog files to create a disk-based catalog containing the partially backed up volume. At step 360, the catalog server 250 passes the information necessary to query this disk-based catalog to the job manager 230. Processing then continues to step 365, where the job manager 230 initializes the media server 240 to start maintaining a file containing the amount of data that has been written to the storage devices 150 and the catalog server 250 to start maintaining the temporary catalog files.

At step 370, the job manager 230 connects to the data server 290 to begin the process of writing data stored in the client computer 102 to the storage devices 150. At step 375, a volume containing the data from the client computer 102 is retrieved and a determination is made as to whether the volume had been partially backed up prior to the system failure. If the answer is in the negative, then the data server 290 will read the data from the volume (step 376). At step 377, the data server 290 sends the data to the media server 240, which then stores the data to the storage devices 150, and informs the catalog server 290 of the object containing the data to be backed up. The catalog server 290 then stores that information to the temporary catalog files 263.

At step 378, a determination is made as to whether all the data in the retrieved volume have been stored to the storage devices 150. If the answer is in the negative, then processing continues to step 376. Otherwise, the backup processing of the retrieved volume is complete and processing returns to step 320, where a determination is made as to whether all the volumes that need to be backed up have been processed. Generally, when the backup process of a volume is complete, the job manager 230 performs several wrap up functions, such as notifying the catalog server 250, which then uses the temporary catalog files to generate a permanent disk-based catalog 265 and deletes the temporary catalog files 263, adding a record of the volume to the list of completed volumes, and deinitializing the media server 240, which then deletes its persistent record of data (bytes) written to the storage devices 150. Returning to the query at step 320, if the answer is in the affirmative, which indicates that all the volumes have been backed up, then the job manager 230 will inform the backup server service 210 that the backup job has been completed and delete the list of completed volumes (step 321).

Referring back to step 375 where a determination is made as to whether the volume retrieved from the client computer 102 had been partially backed up prior to the system failure. If the answer is in the affirmative, then the job manager 230 will send the information necessary to query the disk-based catalog containing the partially backed up volume to the data server 290 (step 379). At step 380, a determination is made as to whether all the container and leaf objects in the retrieved volume have been backed up. If the answer is in the affirmative, then processing returns to step 320, where the determination is made as to whether all the volumes that need to be backed up have been processed.

Referring back to step 380, if the answer is in the negative, then the data server 290 will retrieve a container object from the retrieved volume and send to the catalog server 250 the information necessary to query the disk-based catalog as to whether the retrieved container object and its contents have been completely backed up, i.e., successfully written to the storage devices 150 (step 385). The conclusions drawn by the catalog queries about which container and leaf objects have or have not been backed up are made possible by the fact that the data server 290 performs an in-order traversal of the volume during backup processing. That is, a depth first search is performed on the volume, and as each container object is encountered during the traversal, that container and all leaf objects contained at that level are backed up before processing of any sub-containers.

At step 390, the catalog server 250 makes a determination as to whether the retrieved container object is listed in the disk-based catalog containing the partially completed volume. An answer in the negative indicates that the container object and all container and leaf objects below it have not been backed up. No further catalog queries are needed to make this determination, thereby optimizing the network transactions that need to take place. At step 393, the container object and all container and leaf objects below it are backed up and processing then returns to step 380.

Referring back to step 390, if the answer is in the affirmative, the catalog server 250 will make a determination as to whether another container object exists in the disk-based catalog following the entry for the retrieved container object (step 395). An answer in the negative indicates that while the container object itself was backed up successfully, not all leaf objects below it were backed up. Additionally, it indicates that the container objects below the retrieved container and all of their contents have not been backed up. At step 396, further queries are made regarding each leaf object under the retrieved container, and those not found in the catalog are backed up. Next, all containers objects beneath retrieved container and the leaf objects they contain are backed up. No further queries are needed when backing up these containers and their contents. Processing then returns to step 380.

Referring back to step 395, an answer in the affirmative indicates that the retrieved container object and all leaf objects contained directly beneath it have been backed up. In this manner, queries need not be made regarding these leaf objects, again optimizing the network transactions that need to take place. Furthermore, if the answer is in the affirmative, the catalog server 250 will make a determination as to whether another container object exists in the disk-based catalogs following the entry for the retrieved container object and with a depth of less than or equal to that of the retrieved container object (step 400). An answer in the negative indicates that while the retrieved container and all leaf objects directly beneath it have been backed up, one or more container objects beneath it and their contents have only been partially backed up. Since these containers will be retrieved and processed by step 380, we need only return processing to step 380.

Referring back to step 400, an answer in the affirmative indicates that the retrieved container object and all container and leaf objects at all levels beneath it are completely backed up. All of these objects can be skipped without further queries of the disk based catalogs, providing further optimization of the network transactions that need to take place. At step 405, the data server 290 skips the traversal of the container objects under the retrieved container object so that when processing returns to step 380, the next container retrieved will be at a depth less than or equal to the currently retrieved container. Processing then returns to step 380.

While the foregoing is directed to embodiments of the present invention, other and further embodiments of the invention may be devised without departing from the basic scope thereof, and the scope thereof is determined by the claims that follow.

What is claimed is:

1. A computer network for backing up a job that was interrupted during a backup process, comprising:
   means for identifying the job that was interrupted during the backup process;
   means for using the interrupted job to build a list of one or more volumes that still need to be backed up;
   means for generating a catalog containing a partially backed up volume from the list of volumes that still need to be backed up;
   means for retrieving an object from the one or more volumes stored in a client computer;
   means for determining whether the object is listed in the catalog;
   means for determining whether the object is partially backed up if the object is listed in the catalog; and
   means for writing the data contained in the object to one or more storage devices if the object is partially backed up or is not listed in the catalog, wherein the means for using the interrupted job to build the list of volumes comprises:
      means for building a second list of volumes associated with the job that was interrupted during the backup process; and
      means for removing from the second list of volumes associated with the interrupted job a third list of volumes that had been completely backed up.

2. The computer network of claim 1, wherein the partially backed up volume is the first volume listed on the volumes that still need to be backed up.

3. The computer network of claim 1, wherein the catalog is a disk-based catalog.

4. The computer network of claim 1, wherein the object is a container object.

5. The computer network of claim 1, wherein the means for generating the catalog comprises means for storing one or more objects listed in one or more persistent records of one or more temporary catalog files to the catalog.

6. The computer network of claim 1, wherein the means for determining whether the object is partially backed up comprises means for determining that the object is partially backed up if the object is the last object listed in the catalog.

7. The computer network of claim 1, wherein the means for generating the catalog comprises means for identifying the partially backed up volume using one or more persistent records of one or more temporary catalog files and an amount of data previously written to the storage devices.

8. A computer-readable medium having stored thereon a plurality of instructions, the plurality of instructions including instructions which, when executed by a processor, cause the processor to perform functions comprising:
   retrieving, for backup to a backup system, an object from one or more volumes stored in a client computer;
   sending to the backup system at least one query for querying a catalog of the backup system, wherein the catalog comprises: a partially backed up volume, wherein the catalog is generated from a list of one or more volumes that still need to be backed up, and wherein the list is built from at least one job that was interrupted during at least one backup process;
   determining, via the at least one query, (i) that the object is not listed in the catalog or (ii) that the object is listed in the catalog and partially backed up; and
   writing the data contained in the object to one or more storage devices when the object is partially backed up or is not listed in the catalog.

9. The computer-readable medium of claim 8, wherein the plurality of instructions further include instructions which, when executed cause the processor to perform functions comprising:
   identifying the at least one job that was interrupted during the at least one backup process; and
   building the list of one or more volumes that still need to be backed up using the interrupted job.

10. The computer-readable medium of claim 9, wherein the plurality of instructions further include instructions which, when executed cause the processor to perform functions comprising:
    avoiding writing the data contained in the object to the one or more storage devices when the object is completely backed up.

11. The computer-readable medium of claim 9, wherein the plurality of instructions further include instructions which, when executed cause the processor to perform functions comprising:
    removing, from the list of one or more volumes, one or more volumes that were completely backed up.

12. A method comprising for recovering from interruption of a backup process, the method comprising:
    retrieving, for backup to a backup system, an object from one or more volumes stored in a client computer;
    sending to the backup system at least one query for querying a catalog of the backup system, wherein the catalog comprises: a partially backed up volume, wherein the catalog is generated from a list of one or more volumes that still need to be backed up, and wherein the list is built from at least one job that was interrupted during at least one backup process;
    determining, via the at least one query, (i) that the object is not listed in the catalog or (ii) that the object is listed in the catalog and partially backed up; and
    writing the data contained in the object to one or more storage devices when the object is partially backed up or is not listed in the catalog.

13. The method of claim 12, further comprising: avoiding writing the data contained in the object to the storage devices when the object is completely backed up.

14. The method of claim 12, wherein the catalog is a disk-based catalog.

15. The method of claim 12, wherein the object is a container object.

16. The method of claim 12, wherein the partially backed up volume is a volume listed first on the list of one or more volumes that still need to be backed up.

17. The method of claim 12, further comprising:
    Identifying, at a server computer of a backup system, the at least one job that was interrupted during the at least one backup process;
    building, at the server computer as a function of the at least one job, the list of one or more volumes that still need to be backed up; and
    generating the catalog at the server computer from the list of one or more volumes that still need to be backed up.

18. The method of claim 17, wherein building the list of one or more volumes comprises: removing, from the list of one or more volumes, at least one volume that was backed up completely.

19. The method of claim 17, wherein generating the catalog comprises: storing, to the catalog, one or more objects listed in one or more persistent records of one or more temporary catalog files.

20. The method of claim 19, wherein generating the catalog further comprises: discerning the partially backed up volume from (i) one or more persistent records of one or more temporary catalog files and (ii) an amount of data that was written to the storage devices.

21. The method of claim 12, wherein determining that the object is partially backed up comprises: rendering the object as partially backed up when the object is listed last in the catalog.

* * * * *